United States Patent
Ishibashi et al.

(10) Patent No.: US 9,997,974 B2
(45) Date of Patent: Jun. 12, 2018

(54) CONNECTOR DEVICE

(71) Applicants: Sumitomo Wiring Systems, Ltd., Yokkaichi-shi, Mie (JP); HONDA MOTOR CO., LTD., Tokyo (JP)

(72) Inventors: Takeshi Ishibashi, Yokkaichi (JP); Tsukasa Aiba, Wako (JP); Takahide Hashimoto, Wako (JP); Tatsuya Choji, Wako (JP)

(73) Assignees: Sumitomo Wiring Systems, Ltd. (JP); Honda Motor Co., Ltd. (JP)

( * ) Notice: Subject to any disclaimer, the term of this patent is extended or adjusted under 35 U.S.C. 154(b) by 0 days. days.

(21) Appl. No.: 15/545,735

(22) PCT Filed: Jan. 8, 2016

(86) PCT No.: PCT/JP2016/050440
§ 371 (c)(1),
(2) Date: Jul. 24, 2017

(87) PCT Pub. No.: WO2016/121454
PCT Pub. Date: Aug. 4, 2016

(65) Prior Publication Data
US 2018/0006523 A1 Jan. 4, 2018

(30) Foreign Application Priority Data
Jan. 28, 2015 (JP) .................... 2015-014044

(51) Int. Cl.
H02P 1/24 (2006.01)
H01R 4/50 (2006.01)
(Continued)

(52) U.S. Cl.
CPC ............. *H02K 5/225* (2013.01); *H02K 5/124* (2013.01); *H01R 13/03* (2013.01)

(58) Field of Classification Search
None
See application file for complete search history.

(56) References Cited

U.S. PATENT DOCUMENTS

2004/0266269 A1  12/2004  Miyazaki
2005/0090132 A1  4/2005  Miyazaki
(Continued)

FOREIGN PATENT DOCUMENTS

JP  2005-19188  1/2005
JP  3984579  7/2007
(Continued)

OTHER PUBLICATIONS

International Search Report dated Mar. 15, 2016.

*Primary Examiner* — Bentsu Ro
*Assistant Examiner* — Zemenay Truneh
(74) *Attorney, Agent, or Firm* — Gerald E. Hespos; Michael J. Porco; Matthew T. Hespos

(57) ABSTRACT

A motor case (10) has connectors (30) fixed at motor case mounting holes (11), and an inverter case (50) has connectors (60) radially movable at inverter case mounting holes (65). The inverter case (50) is mounted on the motor case (10) so that the connectors (30, 60) fit together. A surface seal (45) is disposed on a lower surface of a flange (42) at an outer periphery of a housing (35) of the motor-side connectors (30), and is compressed elastically against an upper surface of the motor case (10) at an outer periphery of the motor case mounting holes (11). A metal pressing member (20) is fixed on the motor case (10) and presses the flange (42). An axial seal (47) is fit on the outer periphery of the housing (35) and is compressed elastically between the outer periphery and an inner periphery of the second mounting hole (65).

2 Claims, 10 Drawing Sheets

(51) Int. Cl.
*H02K 5/22* (2006.01)
*H02K 5/124* (2006.01)
*H01R 13/03* (2006.01)

(56) References Cited

U.S. PATENT DOCUMENTS

2011/0053404 A1\* 3/2011 Tsuruta .................. H01R 13/03
439/345
2012/0015546 A1 1/2012 Yamaguchi et al.

FOREIGN PATENT DOCUMENTS

JP 2011-34935 2/2011
JP 2015-151139 1/2015

\* cited by examiner

CONNECTOR DEVICE

BACKGROUND

1. Field of the Invention

The present invention relates to a connector device used for electrically connecting a motor and an inverter.

2. Description of the Related Art

In electric vehicles and hybrid vehicles, when a motor and an inverter are electrically connected, motor terminals (connector) and inverter terminals (connector) are conventionally connected using a wire harness.

In recent years, a connector device has been proposed in which, for space saving purposes, for example, a motor-side connector including motor-side terminals in a motor case and an inverter-side connector including inverter-side terminals in an inverter case are disposed opposite each other, and the inverter case is directly connected to the motor case, thereby attaching the respective connectors to each other and connecting the respective terminals. An example of the connector device is disclosed in Japanese Patent Application Laid-Open No. 2011-34935 indicated below.

In this example, the structure of the portions in which the connectors are attached to the cases is such that the connectors are mounted through mounting holes provided in the cases. Accordingly, the mounting holes need to be waterproofed. The connector device has a waterproof structure as follows. A synthetic resin housing of the motor-side connector has a thick flange on the outer periphery thereof. The flange has surface seals attached on upper and lower surfaces thereof. When the connectors are attached to each other, the upper and lower surface seals are elastically compressed and pressed onto the hole edge of the mounting holes of the respective cases, whereby the mounting holes are sealed.

However, in the above waterproof structure, the surface seals are attached on the upper and lower surfaces of the flange of the synthetic resin housing. Accordingly, the structure has not been necessarily sufficiently reliable in terms of waterproof functionality when there is a lack of surface pressure due to molding tolerances of flange thickness, or attaching tolerances of the connectors, for example.

The present invention was made in view of the above circumstances, and an object of the present invention is to provide a highly reliable waterproof structure of a type in which a motor-side connector and an inverter-side connector are attached to each other when their cases are stacked one above the other and coupled with each other.

SUMMARY

According to the present invention, a connector device includes a motor-side connector including a motor-side terminal attached to a first housing; an inverter-side connector including an inverter-side terminal attached to a second housing; a motor case including an upper surface having a first mounting hole through which the motor-side connector is fixedly mounted; and an inverter case including a lower surface having a second mounting hole opened so as to oppose the first mounting hole, the inverter case supporting the inverter-side connector penetrating through the second mounting hole in a radially freely movable manner. The inverter-side connector is fitted with the motor-side connector when the inverter case is stacked on and coupled with the motor case. The connector device includes a surface seal disposed on a lower surface of a flange provided at an outer periphery of the first housing, and elastically compressed between the lower surface and an upper surface of the motor case at an outer periphery of the first mounting hole; a metal pressing member having a pressing portion for pressing the flange and fixed on the upper surface of the motor case; and an axial seal fitted on the outer periphery of the first housing and elastically compressed between the outer periphery and an inner periphery of the second mounting hole.

The motor-side connector penetrates through the first mounting hole in the upper surface of the motor case, and the pressing member is fixed in place on the motor case with the pressing portion pressing the flange of the first housing. Accordingly, the motor-side connector is fixedly mounted to the motor case with the first mounting hole sealed by the surface seal. On the other hand, the inverter-side connector is provided in a floating state with respect to the second mounting hole of the inverter case.

When the inverter case is stacked on the motor case, the inverter-side connector is fitted with the motor-side connector, and also the axial seal fitted on the outer periphery of the first housing is closely attached on the inner periphery of the second mounting hole. Even if the center of the first mounting hole of the motor case and that of the second mounting hole of the inverter case are displaced, the inverter-side connector can radially freely move so as to align the connectors, whereby normal fitting is promoted. In addition, the axial seal is elastically compressed in accordance with the alignment displacement of the second mounting hole, and becomes closely attached on the inner periphery of the second mounting hole.

That is, with respect to the first mounting hole opened in the upper surface of the motor case, the surface seal disposed on the lower surface of the flange of the first housing is adapted to be elastically compressed when the flange is pressed by the metal pressing member. Accordingly, the surface seal can be closely attached with high surface pressure along the entire circumference. Also, with respect to the second mounting hole opened in the lower surface of the inverter case, even if the position of the inverter case is displaced, i.e., even if there is an alignment displacement between the first mounting hole and the second mounting hole, the axial seal can be closely attached on the inner periphery of the second mounting hole while being elastically compressed in accordance with the alignment displacement.

As a result, both the first mounting hole of the motor case and the second mounting hole of the inverter case can be sealed with high reliability.

The following configurations may be adopted.

(1) The motor case may have two of the motor-side connectors, and the inverter case may have two of the inverter-side connectors, the motor-side connectors and the inverter-side connectors being opposed to each other. The pressing member may include holding holes in which the motor-side connectors are individually fitted, and may include a shield shell having the pressing portion provided in the holding holes.

The motor-side connectors, fitted in the holding holes in the shield shell, penetrate through the first mounting holes opened in the upper surface of the motor case, and, when the shield shell is fixed in place on the upper surface of the motor case, the pressing portion provided in each of the holding holes presses the flange of each of the first housings, and causes the surface seal to be elastically compressed and closely attached on the hole edge of the first mounting hole.

Because both of the surface seals are pressed by a single shield shell, the structure is simple compared with the case where pressing members are individually provided. In addition, equal surface pressures can be obtained for both of the surface seals.

(2) The connector device may further include another axial seal fitted on the outer periphery of the first housing, the other axial seal being closely attached on an inner periphery of the holding holes of the shield shell.

By the other axial seal, penetration of water via the holding holes in the shield shell can be prevented. The two motor-side connectors are held in the respective holding holes by friction with the other axial seal in a sub-assembly. The operation for attaching the two motor-side connectors on the upper surface of the motor case can be performed efficiently.

According to the present invention, mounting holes of both a motor case and an inverter case can be sealed with high reliability.

DETAILED DESCRIPTION

An embodiment of the present invention will be described with reference to FIG. 1 to FIG. 10.

Figure 5:
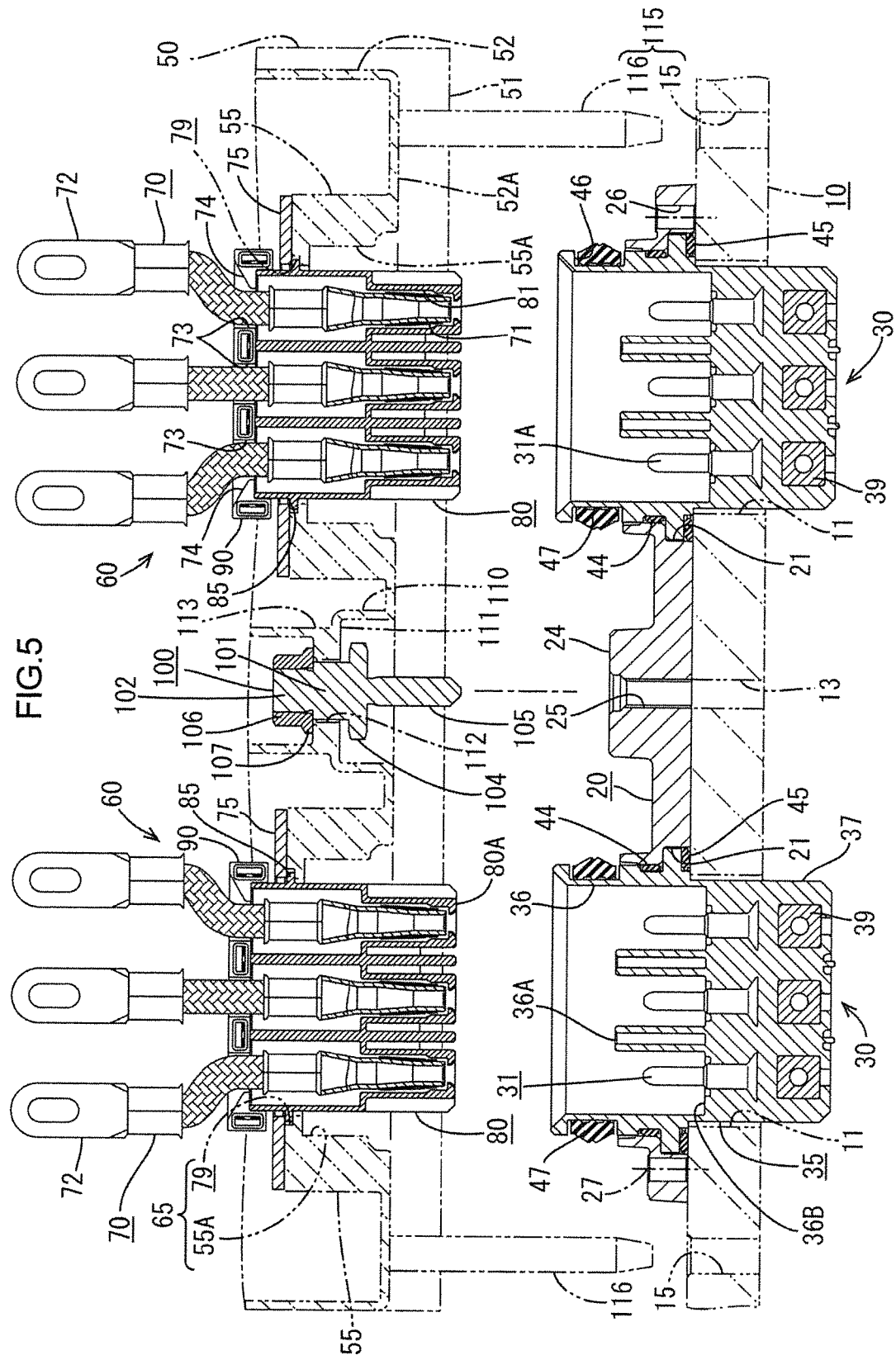
FIG. 5 is a front cross sectional view (taken along lines V-V in FIG. 3 and FIG. 4) of the connectors before being attached to each other.

In this embodiment, as illustrated in FIG. 5, motor-side connectors 30 are attached to a motor case 10 constituting a motor. To an inverter case 50 constituting an inverter PCU (hereafter simply referred to as the inverter), inverter-side connectors 60 are attached, vertically facing the motor-side connectors 30. When the inverter case 50 is placed on the motor case 10 and coupled therewith, the motor-side connectors 30 and the inverter-side connectors 60 are attached to each other.

In the present embodiment, two motor-side connectors 30 and two inverter-side connectors 60 are provided, each having three poles. In other words, there are provided two, right and left, sets of the motor-side connectors 30 and the inverter-side connectors 60 opposing each other.

Figure 1:
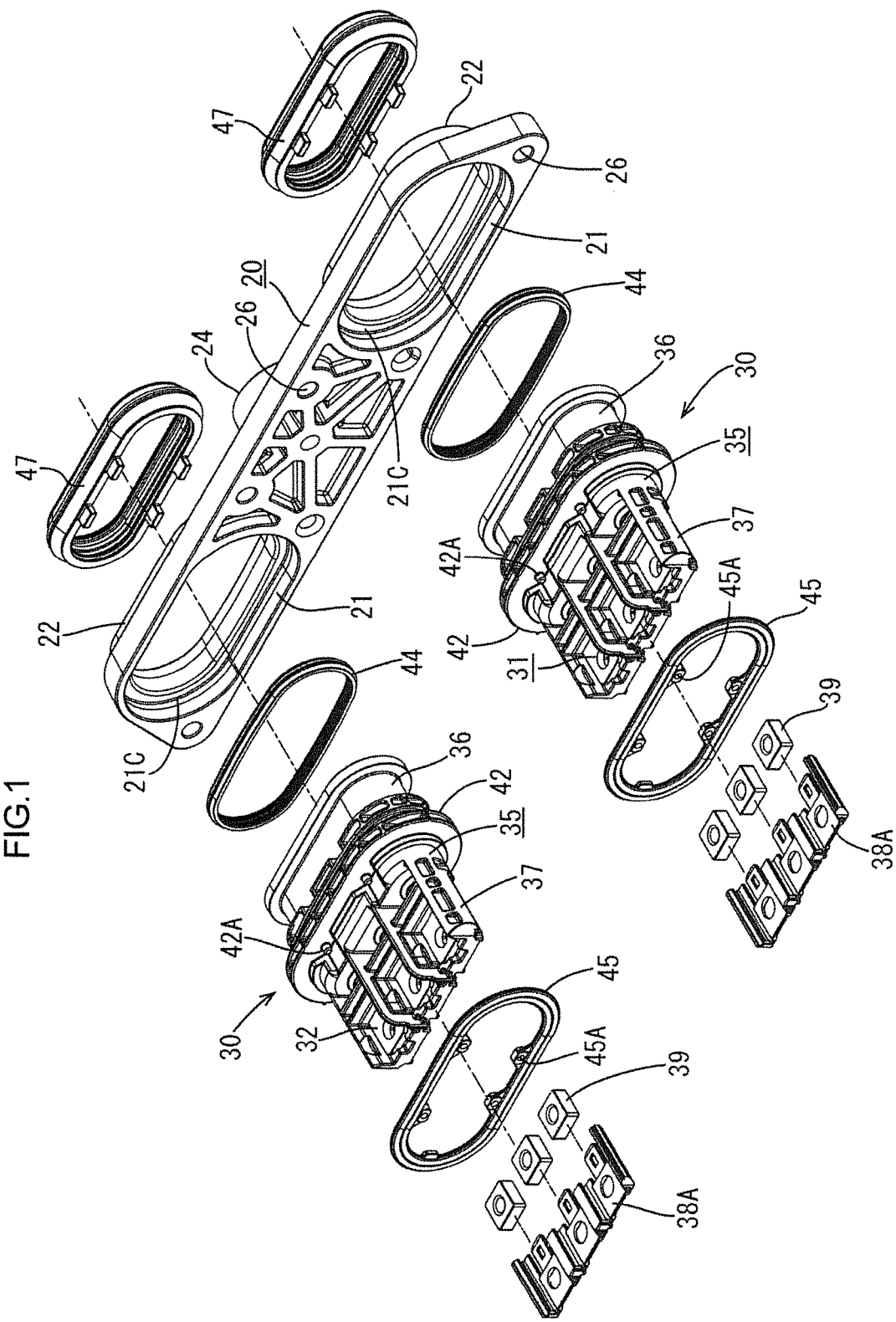
FIG. 1 is an exploded perspective view of a motor-side connector according to an embodiment of the present invention.
Figure 6:
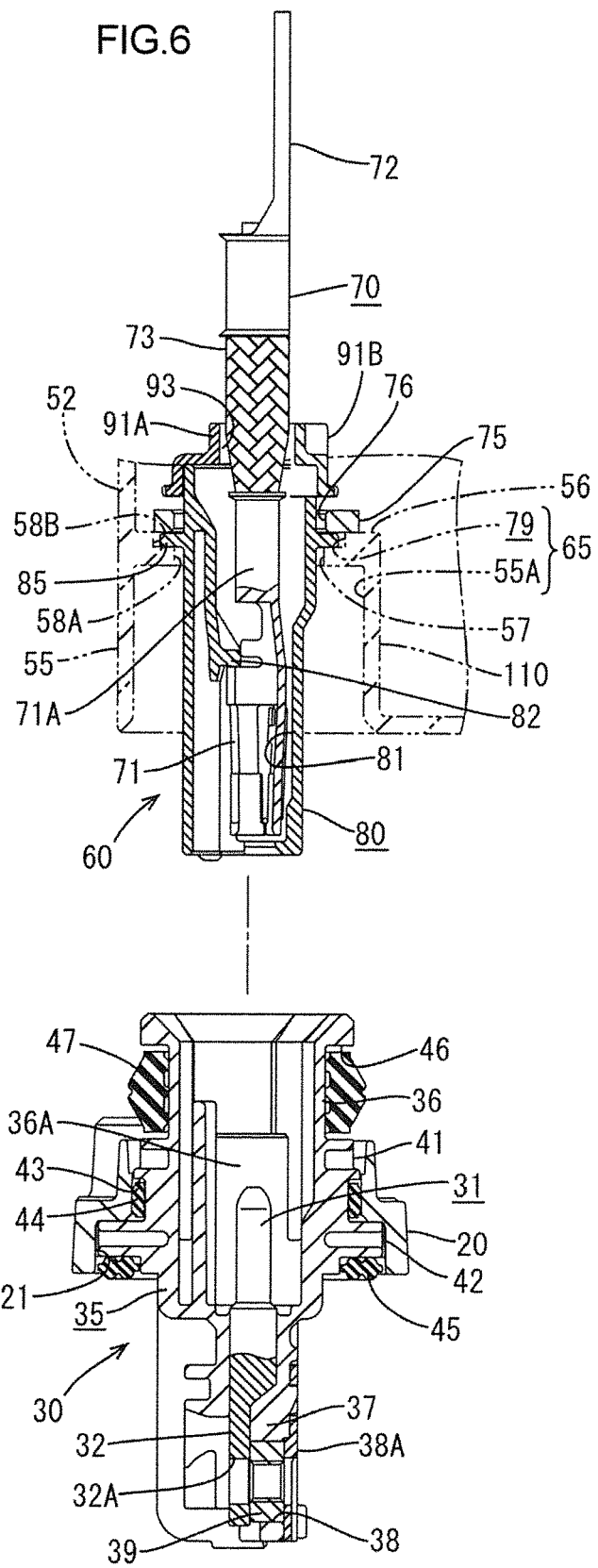
FIG. 6 is a lateral cross sectional view (taken along lines VI-VI in FIG. 3 and FIG. 4) of the connectors before being attached to each other.
Figure 7:
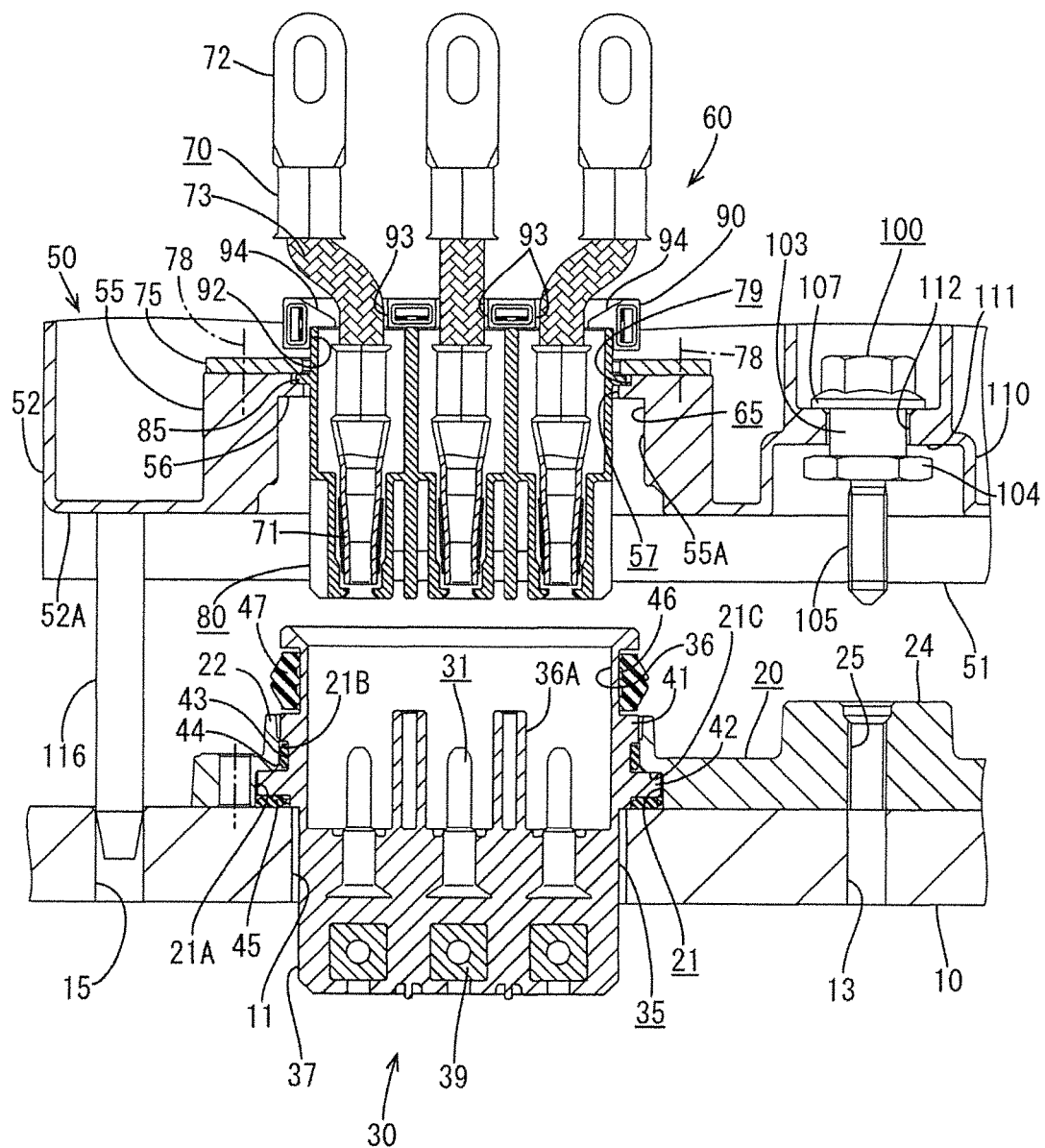
FIG. 7 is a partial cross sectional view illustrating a state immediately before the start of attaching in a step of attaching the connectors to each other.

The motor side will be described. As illustrated in FIG. 1, FIG. 6, and FIG. 7, the motor-side connectors 30 are each formed with three motor-side terminals 31 embedded in a synthetic resin male housing 35 by insert molding. The motor-side terminals 31 are male terminals including round pins with connecting plate portions 32 formed at the lower end, the connecting plate portions 32 having connecting holes 32A opened therein.

The male housing 35 includes an oval and tubular hood portion 36 having an upper surface opening, and a terminal base 37 continuously provided on a lower surface side of the hood portion 36. In the hood portion 36, two partition walls 36A are formed so as to rise from a bottom surface of the hood portion 36.

In the male housing 35, three motor-side terminals 31 are embedded side by side. The ends of the motor-side terminals 31 respectively protrude into the three regions partitioned by the partition walls 36A in the hood portion 36. The connecting plate portions 32 of the motor-side terminals 31 are disposed side by side while being exposed at the lower end of the terminal base 37.

In the rear sides of the respective connecting plate portions 32 of the terminal base 37, nut accommodating holes 38 are formed. In the respective nut accommodating holes 38, square nuts 39 are non-rotatably accommodated and retained by holders 38A attached to back surfaces thereof.

Figure 3:
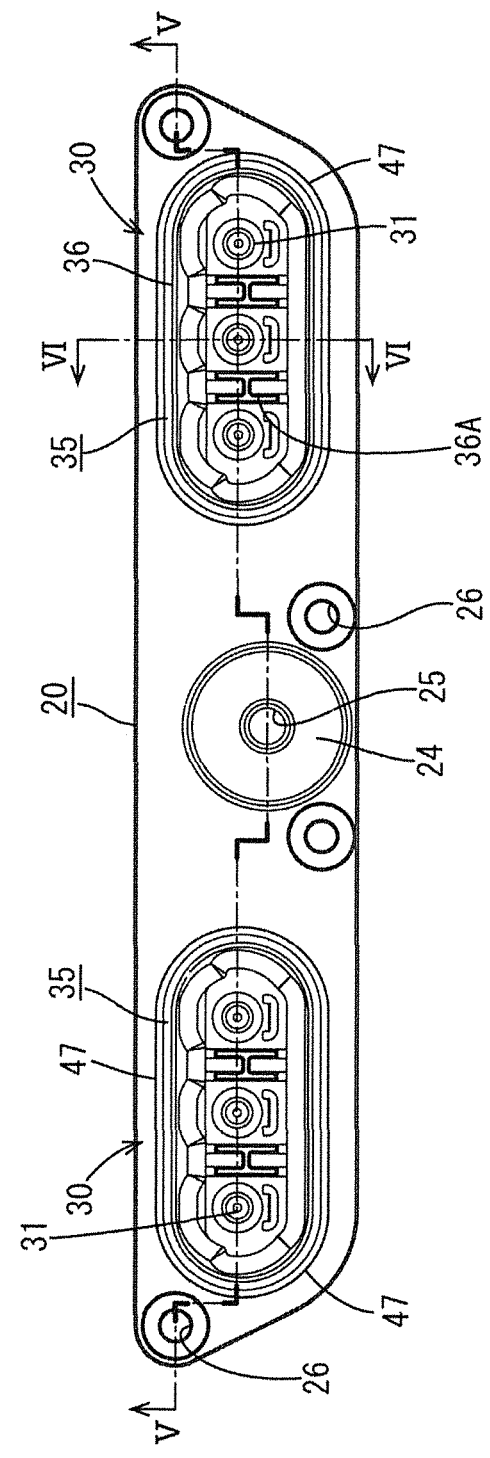
FIG. 3 is a plan view of a motor-side connector attachment structure.

As illustrated in FIG. 3 and FIG. 5, the two motor-side connectors 30 are configured to be attached to the motor case 10 while being held in predetermined positions in a common shield shell 20.

Accordingly, as illustrated in FIG. 6 and FIG. 7, on the lower end outer periphery of the hood portion 36 of the male housing 35, a small-diameter upper flange 41 and a large-diameter lower flange 42 are formed at a predetermined interval. In a groove portion 43 configured between an inner periphery side of the lower flange 42 and the upper flange 41, a second axial seal 44 is fitted.

The shield shell 20 is made of die-cast aluminum, and, as illustrated in FIG. 3, formed in the shape of a thick board with an elongated inverted-trapezoidal planar shape. As illustrated in FIG. 5, in both ends of the shield shell 20 in the longitudinal direction, holding holes 21 into which the motor-side connectors 30 can be attached from below are formed.

As illustrated in FIG. 7, the holding hole 21 is a stepped hole including a large-diameter hole 21A on the lower end side to which the lower flange 42 formed on the male housing 35 is substantially closely attached, and a small-diameter hole 21B on the upper end side to which the upper flange 41 is substantially closely attached. On a hole edge on an upper surface of the small-diameter hole 21B, a peripheral wall 22 is formed so as to rise substantially flush with an inner surface of the small-diameter hole 21B. The large-diameter hole 21A has a greater depth (height) than a thickness of the upper flange 41.

The motor-side connector 30 is fitted into the holding hole 21 of the shield shell 20 from below until the lower flange 42 abuts on a step portion 21C of the holding hole 21 when the upper flange 41 enters an upper end portion of the peripheral wall 22, where the upper end portion of the male housing 35 protrudes above the peripheral wall 22. The second axial seal 44 seals a gap between an outer periphery of the male housing 35 and an inner periphery of the holding holes 21.

On a lower surface of the lower flange 42, a surface seal 45 having a ring shape slightly larger than a first mounting holes 11, as will be described later, opened in the motor case 10 is attached. In other words, the surface seal 45, by being pressed onto an upper surface of the motor case 10 at the outer periphery of the first mounting holes 11, functions to seal the first mounting holes 11. As illustrated in FIG. 1, the surface seal 45 is positioned and attached by having a positioning pin 42A protruding from a lower surface of the lower flange 42 fitted into a positioning hole 45A provided in the inner periphery.

In the outer periphery of the hood portion 36 of the male housing 35, an attachment groove 46 is circumferentially provided. In the attachment groove 46, a first axial seal 47 is attached to seal a gap from an inner peripheral surface of a fitting hole 55A, as will be described later, opened in the inverter case 50. The first axial seal 47 is formed in a mountain shape such that, even if the fitting hole 55A is displaced, the first axial seal 47 can be elastically compressed in the gap from the inner peripheral surface of the fitting hole 55A along the entire circumference while absorbing the positional displacement.

As illustrated in FIG. 3 and FIG. 5, at the center of the shield shell 20 in the longitudinal direction, a female screw base 24 is formed to protrude at a position closer to a front edge. In the center of the female screw base 24, a screw hole 25 is formed for threaded engagement of a fitting bolt 100, as will be described later, attached to the inverter case 50 side.

In both ends of the shield shell 20 in the longitudinal direction and on both sides of the female screw base 24, i.e., at a total of four locations, bolt insertion holes 26 are opened.

As illustrated in FIG. 5, in the upper surface of the motor case 10, two first mounting holes 11 are opened at the same pitch as that of the holding holes 21. Into the first mounting holes 11, the lower sides of the male housings 35 protruding downwardly from the holding holes 21 of the shield shell 20 are substantially closely fitted.

The shield shell 20 is placed over the upper surface of the motor case 10 with the lower sides of both male housings 35 fitted in the corresponding first mounting holes 11, and is fixed in place when bolts 27 are inserted into the four bolt insertion holes 26 and screwed into screw holes (not illustrated) formed in the motor case 10. The terminal bases 37 of both male housings 35 protrude into the motor case 10.

Specifically, the motor-side connectors 30 are adapted to be fixedly attached via the shield shell 20 while penetrating through the first mounting holes 11 opened in the upper surface of the motor case 10.

In the upper surface of the motor case 10, a clearance hole 13 is formed at a position aligned with the screw hole 25 formed in the female screw base 24 of the shield shell 20.

The inverter side will be described.

Figure 2:
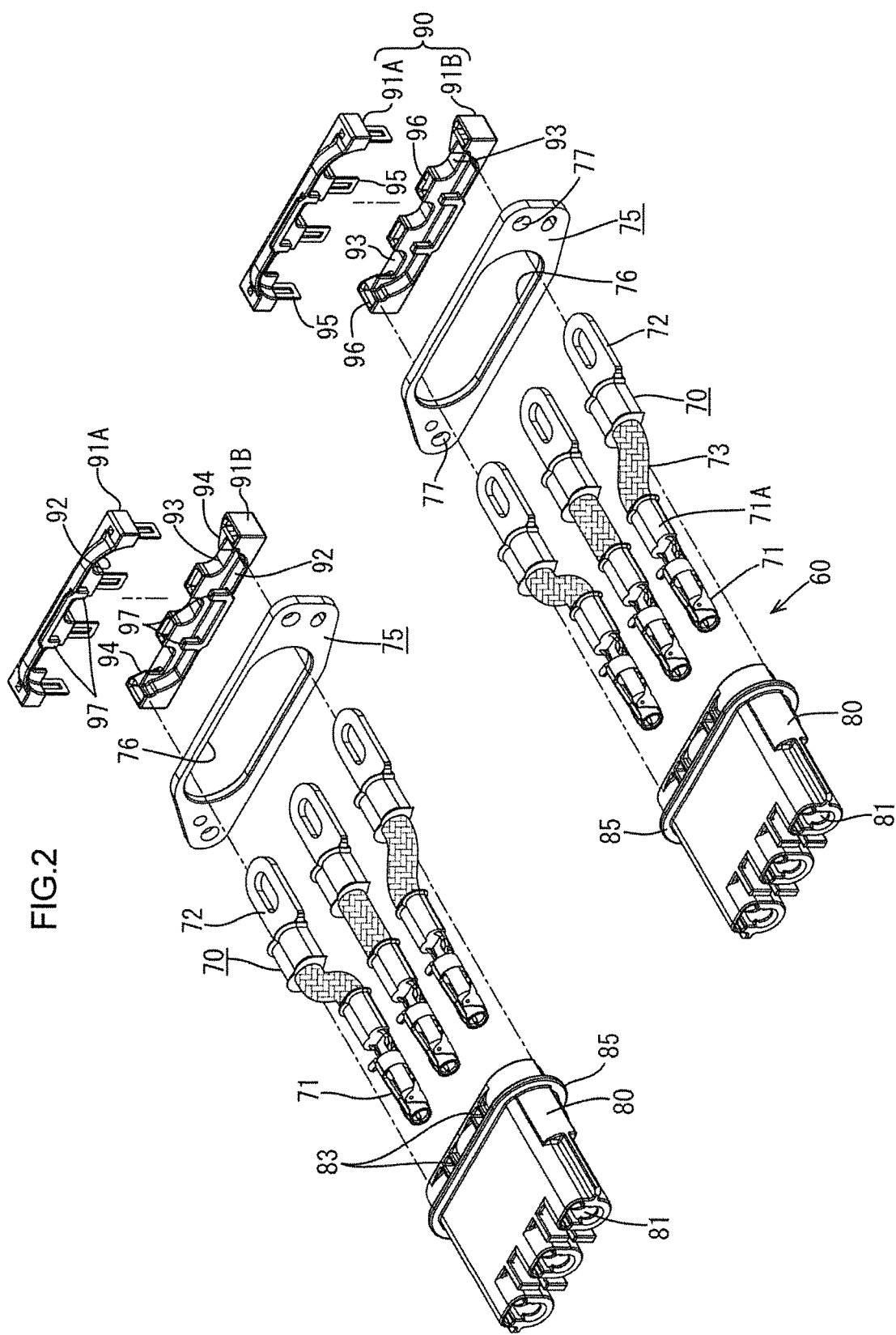
FIG. 2 is an exploded perspective view of an inverter-side connector.

As illustrated in FIG. 2, FIG. 6, and FIG. 7, the inverter-side connectors 60 are each configured of a synthetic resin female housing 80, three inverter-side terminals 70 attached in the female housing 80, and a back retainer 90 for retaining the inverter-side terminals 70. The inverter-side terminals 70 have a structure in which female terminals 71 connected to the above-described motor-side terminals 31 and BA terminals 72 connected to the inverter output terminals (not illustrated) are joined via braided wires 73.

The female housing 80 is formed in a block shape with an oval outline enabling the female housing 80 to fit into the male housing 35 of the motor-side connectors 30. In the female housing 80, three cavities 81 for accommodating the female terminals 71 of the inverter-side terminals 70 are formed side by side.

The back retainer 90 is also made of synthetic resin and, as illustrated in FIG. 2, formed by assembling a pair of divided retainers 91A, 91B. The integrally assembled back retainer 90 is formed in an elongated-square, thick plate shape generally covering the upper surface opening of the male housing 35.

In the lower surface of the integrated back retainer 90, as illustrated in FIG. 7, an oval fitting recess portion 92 having a predetermined depth is formed for closely fitting the upper end portion of the female housing 80. In a roof surface of the fitting recess portion 92, three insertion holes 93 are formed at the same pitch as that of the cavities 81 so as to allow insertion of the ends of the braided wires 73 that are connected to the female terminals 71. Of the three insertion holes 93, the insertion holes 93 at both right and left ends have tapered surfaces 94 where the respective surfaces on the outside in the direction in which the insertion holes are arranged (the left-side surface of the left-end insertion hole 93, and the right-side surface of the right-end insertion hole 93) are upwardly diagonally opened.

As illustrated in FIG. 2, on the divided retainer 91A that is one of the divided retainers 91A, 91B, a total of four locking pieces 95 are formed protruding at both ends of the divided retainer 91A in the longitudinal direction and between the insertion holes 93. On the other divided retainer 91B, four lock receiver portions 96 are formed at corresponding positions to receive and retain the respective locking pieces 95.

From a linear wall surface of the fitting recess portion 92 of each of the divided retainers 91A, 91B, a pair of attachment protrusions 97 is formed in a protruding manner. In each of linear front and rear surfaces at the upper end of the female housing 80, a pair of attachment recess portions 83 is bored for the fitting of the attachment protrusions 97.

When the inverter-side connector 60 is assembled, the female terminals 71 of the inverter-side terminals 70 are inserted into the corresponding cavities 81 of the female housing 80 from above, and primarily locked by lances 82 provided in the cavities 81 (see FIG. 6). Then, the pair of divided retainers 91A, 91B is disposed so as to sandwich the upper end portion of the female housing 80 from the front and rear, and the attachment protrusions 97 are fitted in the attachment recess portions 83. The locking pieces 95 are inserted into the lock receiver portions 96 until the opposing edges are abutted on each other. When the opposing edges are normally abutted on each other, the locking pieces 95 are elastically locked in the lock receiver portions 96, whereby the back retainer 90 is integrally assembled. The back retainer 90 is attached with the upper end portion of the female housing 80 being fitted in the fitting recess portion 92. When the back retainer 90 is attached, barrels 71A at the upper end of the female terminals 71 are locked in hole edges on the lower side of the insertion holes 93 and thus doubly retained.

The braided wires 73 connected to the barrels 71A of the female terminals 71 are pulled up via the insertion holes 93 of the back retainer 90. In the present embodiment, as illustrated in FIG. 5, with respect to the three inverter-side terminals 70, the BA terminals 72 are disposed at a greater pitch than that of the female terminals 71. Accordingly, for the two inverter-side terminals 70 at both right and left ends, the respective braided wires 73 need to be bent toward right or left upon exiting the insertion holes 93 of the back retainer 90. Since the insertion holes 93 at the both ends of the back retainer 90 have the tapered surfaces 94, the braided wires 73 can be bent as described above without interference with the inner surfaces of the insertion holes 93.

While the above-described motor-side connectors 30 are fixedly attached to the motor case 10, the inverter-side connectors 60 are attached to the inverter case 50 in a floating state.

As schematically illustrated in FIG. 5 and FIG. 7, the inverter case 50 has a body case 51 on a front surface side of which a connector attachment case 52 for attachment of the inverter-side connectors 60 (hereafter "attachment case 52") is formed extending with a bottom raised by a predetermined size. Accordingly, the inverter-side connectors 60 are attached to the attachment case 52 in a floating state.

The attachment structure for the inverter-side connectors 60 will be described with reference to FIG. 6 and FIG. 7. The female housing 80 of the inverter-side connector 60 has a flange 85 at a position closer to the upper end, the flange 85 extending along the entire circumference.

At both right and left ends on the bottom surface 52A of the attachment case 52, two mount bases 55 with lower surface openings are formed so as to rise upward. The mount bases 55 have a substantially parallelogram planar shape. The interior of the mount bases 55 provides the fitting hole 55A in which the upper end portion of the male housing 35 of the motor-side connectors 30 is fitted.

A roof wall 56 of the mount base 55 has a support hole 57 in which the female housing 80 is inserted from above and supported. The support holes 57 are disposed at the same interval as the interval of the holding holes 21 opened in the shield shell 20 on the motor side. As illustrated in FIG. 6, the support hole 57 is a stepped hole including a small-diameter hole 58A on the lower side into which the outer periphery of the female housing 80 can be inserted with a clearance, and a large-diameter hole 58B in the upper side into which the flange 85 of the female housing 80 can be inserted with a clearance. The large-diameter hole 58B on the upper side has a depth which is slightly smaller than the thickness of the flange 85.

The right and left side walls of each of the mount bases 55 are thickly formed.

Figure 4:
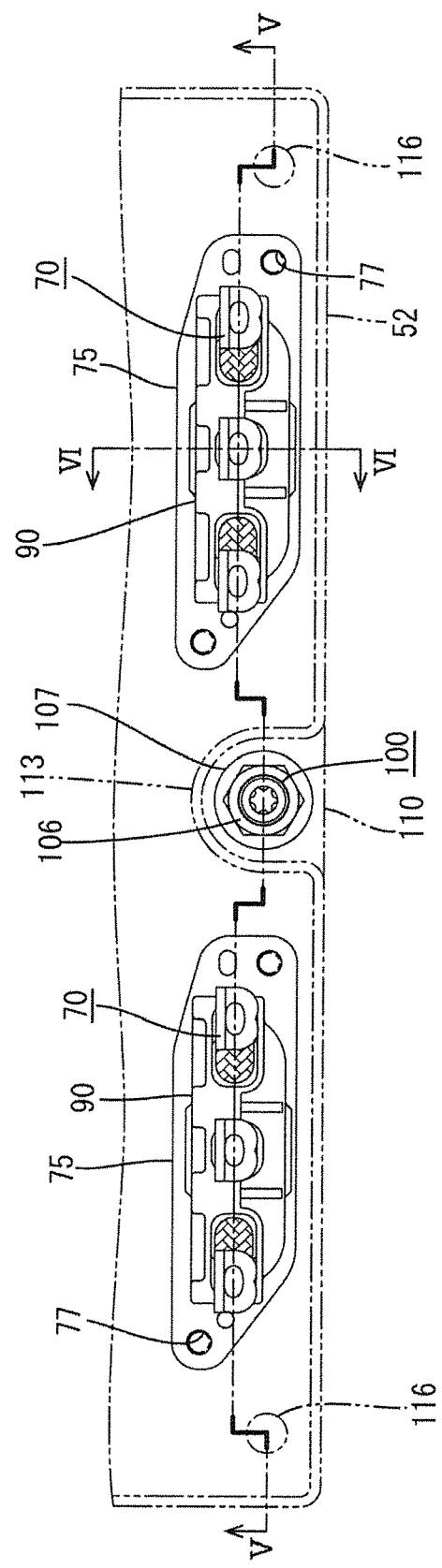
FIG. 4 is a plan view of an inverter-side connector attachment structure.

The mount bases 55 are each adapted to be covered with a metal plate bracket 75. The bracket 75 has a planar shape substantially identical to the upper surface of the mount bases 55. As illustrated in FIG. 6, the bracket 75 has a lock hole 76 into which the outer periphery of the female housing 80 can be inserted with a clearance. As illustrated in FIG. 4, the bracket 75 has screw insertion holes 77 at both ends. Bypassing screws 78 (see FIG. 7) through the screw insertion holes 77 and threadedly engaging the screws with screw holes (not illustrated) formed in right and left side walls of the mount bases 55, the bracket 75 is fixed in place on the upper surface of the mount bases 55 with the lock hole 76 disposed concentrically with the support hole 57.

In a procedure for attaching the female housing 80, the female housing 80 is inserted into the support hole 57 of the mount base 55 from above, and the flange 85 is received and supported on the hole edge of the small-diameter hole 58A of the support hole 57. Then, the bracket 75 is placed over the upper surface of the mount bases 55 while allowing for insertion of the upper end portion of the female housing 80 into the lock hole 76, and fixed by being fastened by the screws 78. The flange 85 is locked on the hole edge of the lock hole 76, thus preventing the female housing 80 from being pulled upward.

Thus, the female housing 80, with the upper end portion thereof penetrating through the support hole 57 of the mount base 55 and the lock hole 76 of the bracket 75, is supported in such a way as to be radially freely movable by as much as the clearance mainly between the flange 85 and the large-diameter hole 58B. In this way, the female housing 80 is attached in a floating state with respect to the attachment case 52. Accordingly, a free movement permitting hole 79 is formed by the support hole 57 of the mount base 55 on the attachment case 52 and the lock hole 76 of the bracket 75 fixed on the mount base 55. In the free movement permitting hole 79, the inverter-side connector 60 is supported in a radially freely movable manner.

The free movement permitting hole 79 and the fitting hole 55A constitute a second mounting hole 65 in which the inverter-side connector 60 freely movably penetrates through and is supported.

In the present embodiment, when the inverter case 50 is placed on and coupled with the motor case 10, as partially described above, the motor-side connectors 30 and the inverter-side connectors 60 are attached to each other in a structure described below.

As illustrated in FIG. 4 and FIG. 5, between the mount bases 55 on the bottom surface of the attachment case 52, a pedestal 110 is formed to support the fitting bolt 100 in an axially rotatable manner. The pedestal 110 has a keyhole-like planar shape and is formed so as to rise to substantially the central height position of the mount bases 55, with an open lower surface. A thick roof wall 111 of the pedestal 110 has an insertion hole 112 for the fitting bolt 100 formed penetrating therethrough. A protection wall 113 is formed upright from right and left side edges to a rear edge on the upper surface of the roof wall 111. In other words, the protection wall 113 is formed continuously with a front wall of the attachment case 52, with an open front surface.

As illustrated in FIG. 5, the fitting bolt 100 includes a bolt body 101 and a nut 106 with a flange 107. The bolt body 101 includes, in order from the top, amount portion 102 with male threads; a large-diameter insertion portion 103; a hexagonal flange 104; and a male screw portion 105. The nut 106 with flange 107 is forcibly screwed onto the mount portion 102 of the bolt body 101 throughout the entire height of the mount portion 102 and is thereby fixedly mounted. In this way, the fitting bolt 100 is formed.

In the thus formed fitting bolt 100, the insertion portion 103 of the bolt body 101 has a diameter enabling insertion into the insertion hole 112 opened in the roof wall 111 of the pedestal 110 in an axially rotatable manner. The interval between the flange 107 of the nut 106 and the hexagonal flange 104 is set to be greater than a thickness of the roof wall 111 by a predetermined amount.

When the fitting bolt 100 is attached to the pedestal 110, the bolt body 101 is inserted into the insertion hole 112 from below, and the nut 106 is fixedly mounted onto the mount portion 102 at the upper end protruding above the insertion hole 112, whereby the fitting bolt 100 is formed. The fitting bolt 100, with the flange 107 being received on the hole edge on the upper side of the insertion hole 112, is supported by being hung in an axially rotatable manner. In this case, between the hexagonal flange 104 and the lower surface of the roof wall 111, a predetermined amount of gap is ensured. The lower end of the male screw portion 105 protrudes from the bottom surface 52A of the attachment case 52 by a predetermined size so as to be threadedly engageable in the screw hole 25 of the female screw base 24 provided on the shield shell 20 fixed on the upper surface of the motor case 10.

When the inverter case 50 is mounted on the motor case 10, a positioning mechanism 115 is provided to enable mounting in a predetermined position. As illustrated in FIG. 5, the positioning mechanism 115 includes a pair of positioning pins 116 hanging from both right and left ends of the bottom surface 52A of the attachment case 52 of the inverter case 50, and, on the upper surface of the motor case 10, a pair of positioning holes 15 into which the positioning pins 116 can be closely inserted.

When the inverter case 50 is normally positioned with respect to the motor case 10 and opposed thereto, the inverter-side connectors 60 and the motor-side connectors 30 are set to coaxially oppose each other, and the fitting bolt 100 and the screw hole 25 of the female screw base 24 are set to coaxially oppose each other.

The coupling of the inverter case 50 and the motor case 10 is adapted to be performed by fastening the bottom surface of the body case 51 of the inverter case 50 and the upper surface of the motor case 10 using bolts 120 (see FIG. 10) at a plurality of locations, such as at the four corners.

The operation of the present embodiment, which has the above-described structure, will be described.

As illustrated in FIG. 3 and FIG. 5, on the motor side, the two motor-side connectors 30 are held by being fitted in the respective holding holes 21 of the shield shell 20 in a water-tight manner via the respective second axial seals 44. The shield shell 20 is placed on the motor case 10 while the lower ends of the male housings 35 are fitted into the corresponding first mounting holes 11 opened in the upper surface of the motor case 10. The shield shell 20 is fixed in place by passing the bolts 27 through the bolt insertion holes 26 opened at four locations in the shield shell 20, and screwing the bolts 27 into screw holes in the motor case 10. In this way, the motor-side connectors 30 are fixedly attached while being arranged to the right and left at a certain interval on the upper surface of the motor case 10.

When the shield shell 20 is fixed, the step portions 21C of the holding holes 21 press the lower flanges 42 of the male housings 35, whereby the surface seals 45 disposed on the lower surfaces of the flanges 42 are elastically compressed and pressed onto the upper surface of the motor case 10 at the outer periphery of the first mounting holes 11, thereby sealing the first mounting holes 11.

On the other hand, on the inverter side, the two inverter-side connectors 60 are supported while penetrating through the second mounting holes 65 (the free movement permitting hole 79 and the fitting hole 55A) of the mount bases 55 of the attachment case 52 of the inverter case 50 in a radially freely movable manner. That is, the two inverter-side connectors 60 are attached in a floating state. With respect to the three inverter-side terminals 70, the pitch of the BA terminals 72 is increased with the braided wires 73 of the inverter-side terminals 70 on the both right and left sides being bent outward.

Also, the fitting bolt 100 is hung and supported rotatably with respect to the pedestal 110.

The inverter-side connectors 60 are fitted with the corresponding motor-side connectors 30 as follows.

From the state illustrated in FIG. 5, the inverter case is positioned by inserting the positioning pins 116 into the positioning holes 15 and lowered onto the motor case 10. As illustrated in FIG. 7, when the positioning pins 116 have entered the positioning holes 15 by a predetermined amount, the inverter-side connectors 60 begin to be fit with the motor-side connectors 30.

Even if the first mounting holes 11 of the motor case 10 and the second mounting hole 65 of the inverter case 50 are not aligned, the inverter-side connectors 60 can move radially freely and become aligned with the motor-side connectors 30 since the inverter-side connectors 60 are supported in the free movement permitting hole 79 in a floating state. Accordingly, the connectors 30, 60 can be normally and smoothly fitted with each other.

Figure 8:
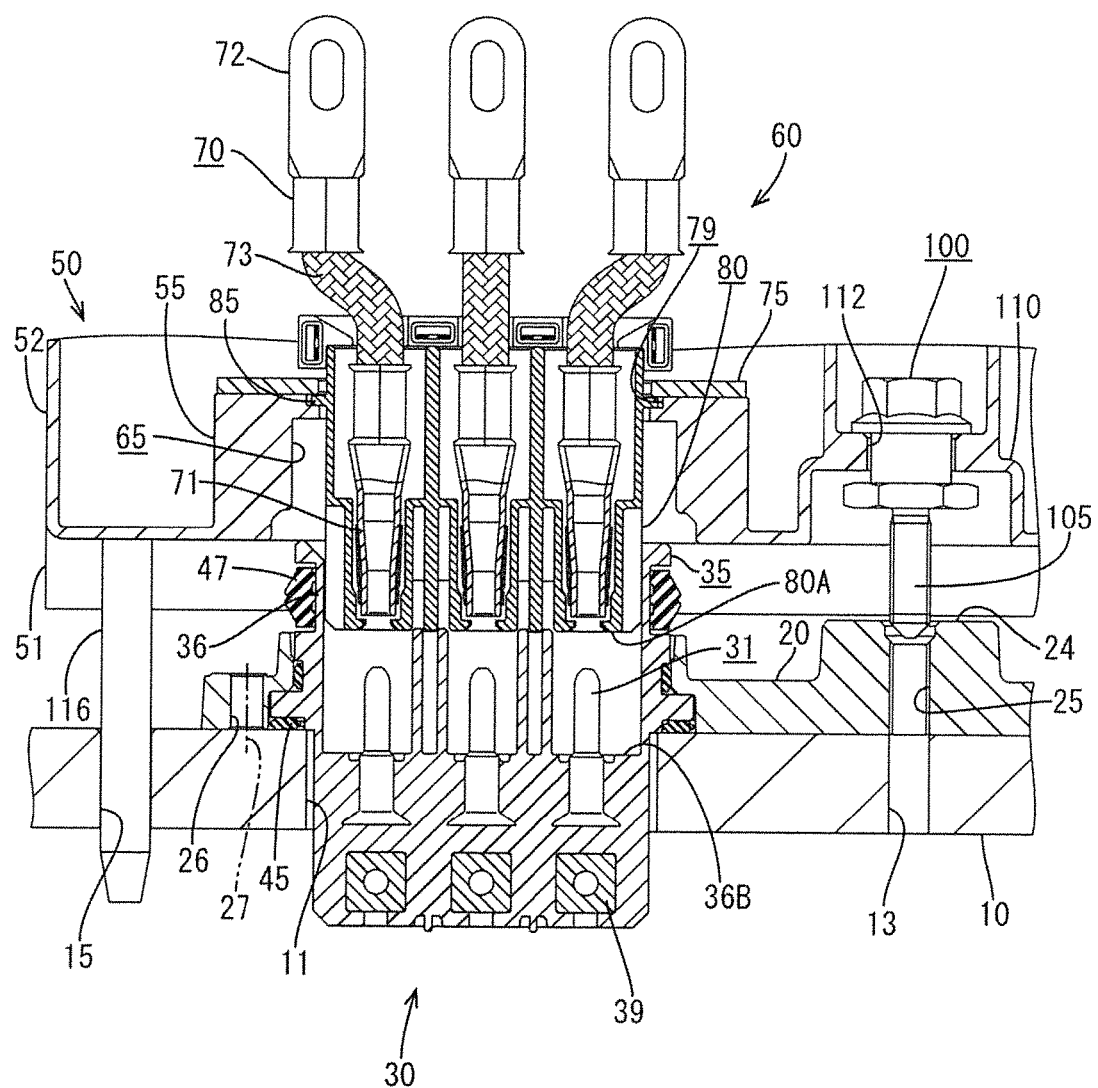
FIG. 8 is a partial cross sectional view illustrating a state in which a fitting bolt has just entered a screw hole.

As illustrated in FIG. 8, when the inverter-side connectors are fitted with the opposing motor-side connectors 30 by a predetermined amount, the end of the male screw portion 105 of the fitting bolt 100 faces the entry of the screw hole 25 cut in the female screw base 24 of the shield shell 20.

Then, the male screw portion 105 of the fitting bolt 100 is screwed into the screw hole 25 using a tool such as a torque wrench. As a result, due to an associated boosting function, the inverter case 50 including the attachment case 52 is pulled toward the upper surface of the motor case 10, and also the inverter-side connectors 60 are gradually fitted with the motor-side connectors 30.

Figure 9:
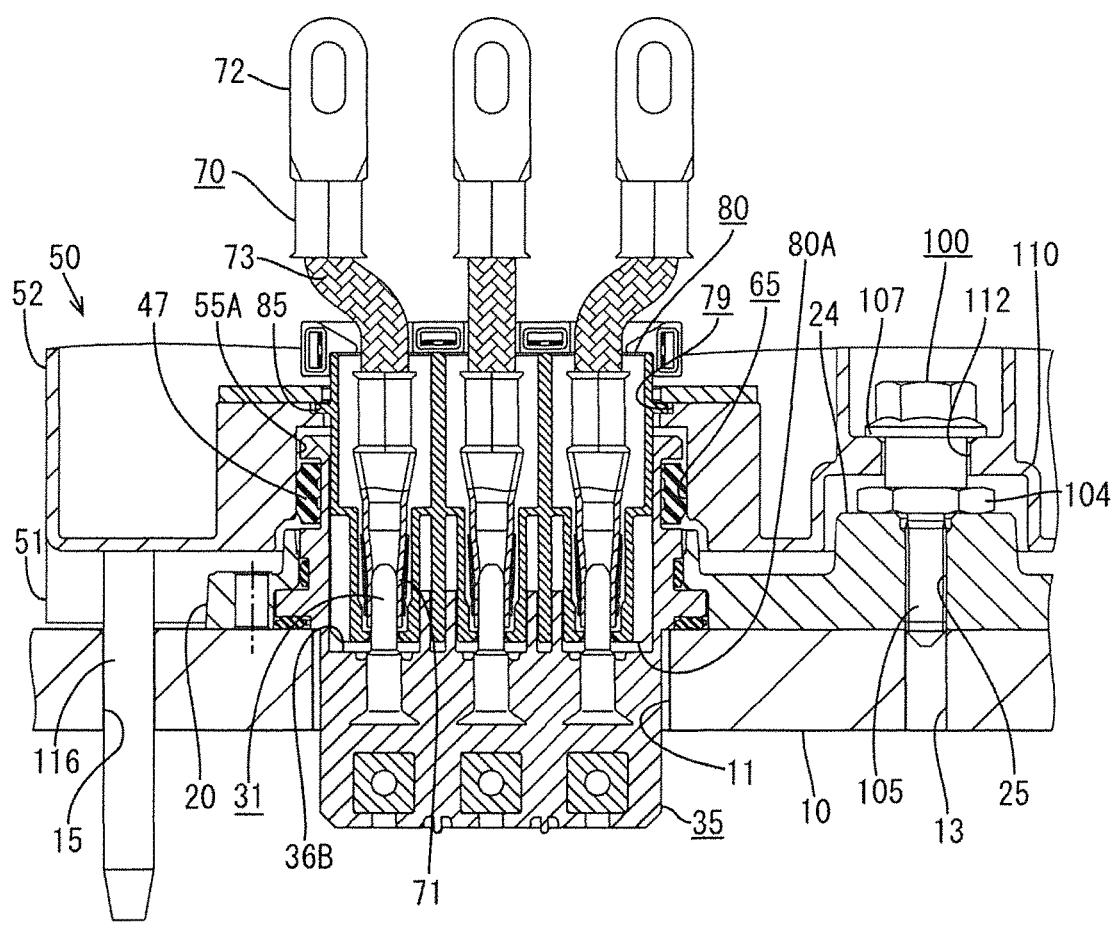
FIG. 9 is a partial cross sectional view illustrating a state at the end of screwing of the fitting bolt.

When the fitting bolt 100 is further screwed and, as illustrated in FIG. 9, the hexagonal flange 104 of the fitting bolt 100 is abutted on the upper surface of the female screw base 24, further screwing of the fitting bolt 100, i.e., the pulling of the inverter case 50 is stopped.

In this process, the fitting of the inverter-side connectors 60 with the motor-side connectors 30 further progresses, and the lower surface 80A of the female housing 80 reaches a position above a back surface 36B of the hood portion 36 of the male housing 35 by a predetermined size when the fitting is stopped. In this state, the female terminals 71 of the inverter-side terminals 70 and the motor-side terminals 31 have ensured an amount of fit sufficient for obtaining a proper state of continuity.

The bottom surface of the body case 51 of the inverter case 50 is still afloat from the upper surface of the motor case 10.

When the connectors 30, 60 are fitted with each other, the hood portion 36 of the male housing 35 is fitted in the fitting hole 55A of the second mounting hole 65 while the first axial seal 47 is elastically compressed. In this case, even if the axial center of the second mounting hole 65 (fitting hole 55A) is displaced with respect to the axial center of the male housing 35, the first axial seal 47, being formed in a mountain shape, can elastically compress along the entire circumference between the hood portion 36 and the inner peripheral surface of the fitting hole 55A while absorbing the alignment displacement, whereby the second mounting hole 65 is sealed along the entire circumference.

Figure 10:
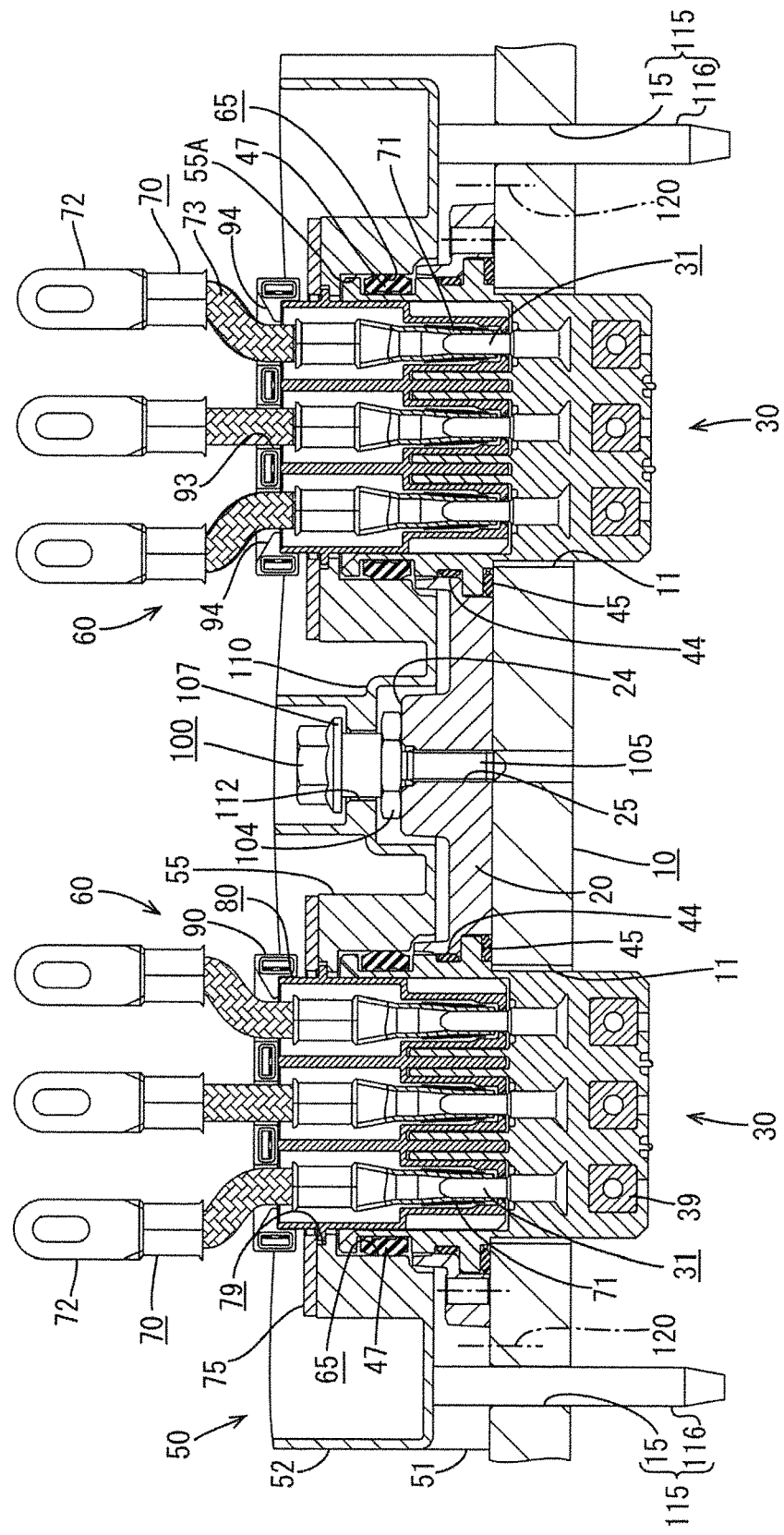
FIG. 10 is a cross sectional view of the motor case and the inverter case having been fastened to each other.

Finally, the body case 51 of the inverter case 50 and the motor case 10 are fastened to each other with the bolts 120 and, as illustrated in FIG. 10, the body case 51 is fixed in a state of being abutted on the upper surface of the motor case 10. This also involves the roof wall 111 of the pedestal 110, from which the fitting bolt 100 has been hung and supported, being lowered so as to be spaced from the flange 107 on the upper side of the fitting bolt 100, and also the attachment case 52 being lowered, whereby the inverter-side connectors 60 are fitted with the motor-side connectors 30 until the lower surface 80A of the female housing 80 is very close to the back surface 36B of the hood portion 36 of the male housing 35. The sealed state of the second mounting hole 65 (fitting hole 55A) by the first axial seal 47 is also maintained.

In this way, the inverter case 50 is mounted on and coupled with the motor case 10, whereby the operation for fitting the motor-side connectors 30 with the inverter-side connectors 60 is completed.

In the motor case 10, on the terminal bases 37 of the motor-side connectors 30, the input terminals of a motor are engaged on the connecting plate portions 32 of the motor-side terminals 31 and connected using bolts. On the other hand, in the inverter case 50, the BA terminals 72 of the inverter-side terminals 70 are connected to the output terminals of an inverter by screwing using terminal bases, which are not illustrated.

As described above, according to the present embodiment, with respect to the first mounting holes 11 opened in the upper surface of the motor case 10, the surface seal 45 disposed on the lower surface of the lower flange 42 of the male housing 35 is elastically compressed by being pressed by the step portion 21C of the metal shield shell 25 via the flange 42, and can therefore be closely attached with high surface pressure along the entire circumference. With respect to the second mounting hole 65 provided in the inverter case 50 (attachment case 52), even if the second mounting hole 65 has an alignment displacement with respect to the first mounting holes 11, the mountain-shaped first axial seal 47 fitted on the hood portion 36 of the male housing 35 can be closely attached along the entire circumference of the inner periphery of the fitting hole 55A while absorbing the alignment displacement.

Accordingly, the first mounting holes 11 of the motor case 10 and the second mounting hole 65 of the inverter case 50 can both be sealed with high reliability.

The two motor-side connectors 30, by being held in the holding holes 21 of the single shield shell 20 respectively via the second axial seals 44, becomes a sub-assembly. Accordingly, when the shield shell 20 is fixed in place on the upper surface of the motor case 10, the two motor-side connectors 30 penetrate through the first mounting holes 11 in the upper surface of the motor case 10 and become fixedly attached.

Accordingly, with regard to the sealing of the first mounting holes 11, both of the surface seals 45 are pressed by the single shield shell 20, so that the structure is simplified compared with the case where pressing members are individually provided. In addition, equal surface pressures can be obtained for both of the surface seals 45.

Because the two motor-side connectors 30 are made into a sub-assembly by being held in the single shield shell 20, the operation of attaching the two motor-side connectors 30 on the upper surface of the motor case 10 can be performed efficiently.

The present invention is not limited to the embodiment explained in the above description and described with reference to the drawings, and may include the following exemplary embodiments in the technical scope of the present invention:

While in the embodiment two sets of opposed motor-side connectors and inverter-side connectors are described, the present invention may be similarly applied to one set of a motor-side connector and an inverter-side connector.

While the second axial seal interposed between the motor-side connector and the holding hole of the shield shell is useful when turning the motor-side connector into a sub-assembly in a shield shell using friction, in addition to sealing the holding hole, the second axial seal may be omitted.

The structure of the portion in which the surface seal is pressed by the shield shell may be adopted in ways other than that as described in the embodiment.

EXPLANATION OF SYMBOLS

10: Motor case
11: First mounting hole
20: Shield shell (pressing member)
21: Holding hole
21C: Step portion (pressing portion)
30: Motor-side connector
31: Motor-side terminal
35: Male housing (first housing)
42: Lower flange (flange)
44: Second axial seal (another axial seal)
45: Surface seal
47: First axial seal (axial seal)
50: Inverter case
52: Attachment case
55: Mount base
55A: Fitting hole
60: Inverter-side connector
65: Second mounting hole
70: Inverter-side terminal
79: Free movement permitting hole
80: Female housing (second housing)

The invention claimed is:

1. A connector device comprising:
a motor-side connector including a motor-side terminal attached to a first housing, the first housing having a hood portion with an upper surface opening, the motor-side connector having an upper flange and a lower flange disposed below the upper flange, the upper flange and the lower flange being formed at an outer periphery of the hood portion at a predetermined interval;
an inverter-side connector including an inverter-side terminal attached to a second housing;
a motor case including an upper surface having a first mounting hole through which the motor-side connector is fixedly mounted; and
an inverter case including a lower surface having a second mounting hole opened so as to oppose the first mounting hole, the inverter case supporting the inverter-side connector penetrating through the second mounting hole in a radially freely movable manner,
wherein the inverter-side connector is fitted with the motor-side connector when the inverter case is stacked on and coupled with the motor case,
the connector device comprising:
a surface seal disposed on a lower surface of the lower flange, and elastically compressed between the lower surface and an upper surface of the motor case at an outer periphery of the first mounting hole;
a metal shield shell having a holding hole in which both the upper flange and the lower flange are fitted, and a pressing portion, provided in the holding hole, for pressing the lower flange, the metal shield shell being fixed on the upper surface of the motor case;
an axial seal fitted over the upper flange at the outer periphery of the hood portion, and elastically compressed between the outer periphery and an inner periphery of the second attachment hole; and
another axial seal fitted on a groove portion configured between an inner periphery side of the lower flange and the upper flange, and closely attached on an inner periphery of the holding hole of the shield shell.

2. The connector device according to claim 1, wherein:
the motor case has two of the motor-side connectors, and the inverter case has two of the inverter-side connectors, the motor-side connectors and the inverter-side connectors being opposed to each other; and
the shield shell includes holding holes in which the motor-side connectors are individually fitted.

* * * * *